UNITED STATES PATENT OFFICE.

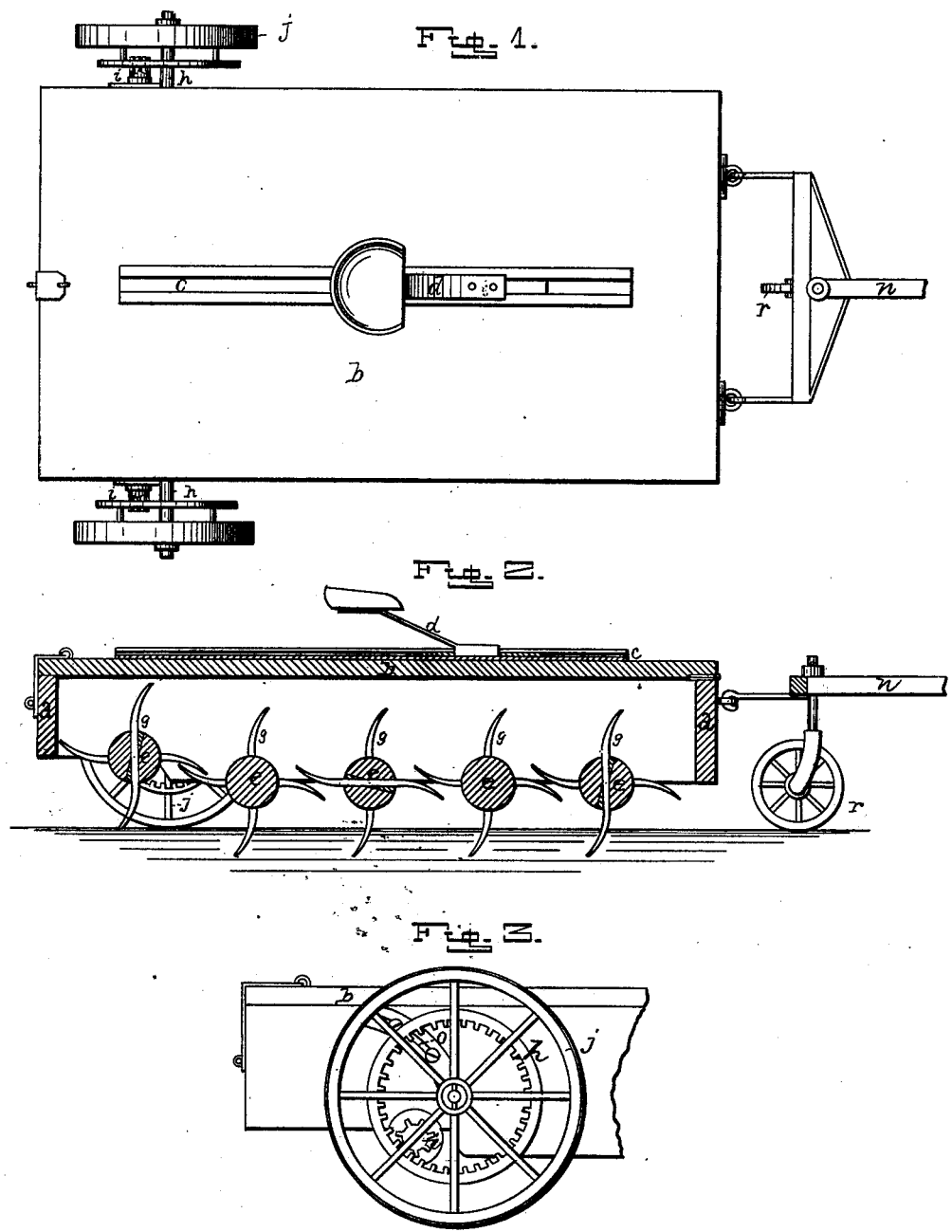

DANIEL LOCKE, OF CRESTON, ILLINOIS.

IMPROVEMENT IN CLOD-CRUSHERS.

Specification forming part of Letters Patent No. 205,969, dated July 16, 1878; application filed June 24, 1878.

*To all whom it may concern:*

Be it known that I, DANIEL LOCKE, of CRESton, in the State of Illinois, have invented certain new and useful Improvements in Clod-Crushers; and I do hereby declare the following to be a full, clear, and exact description of the invention, such as will enable others skilled in the art to which it pertains to make and use it, reference being had to the accompanying drawings, which form part of this specification.

My invention relates to an improvement in clod-crushers; and it consists in the peculiar arrangement and combination of parts, whereby the rear roller is provided with a mechanism for keeping it constantly revolving, so that its teeth cannot become clogged.

It further consists in making the seat adjustable back and forth upon the top of the frame, so that the driver can move his weight from place to place, as may be needed, all of which will be more fully described hereinafter.

The accompanying drawings represent my invention.

*a* represents a rectangular frame, having the top *b* hinged thereto, so as to give free access to the toothed rollers below at any time. Upon the top of this cover is secured the metal guide *c*, in which the lower end of the seat-standard *d* is loosely held, so that the seat can be shifted back and forth at will, thus enabling the driver to throw his weight upon either the front or rear end of the frame, as may be found necessary.

Journaled in suitable boxes in the lower edge of the frame are a number of rollers, *e*, each one of which is armed with a number of curved teeth, *g*, which pass entirely through the rollers, and are secured therein by means of any suitable devices, so that they cannot possibly become loose and drop out. As the machine moves forward, these rollers revolve around, and the sharp-pointed teeth not only harrow the ground and pulverize the clods, but they cut and break the sticks, stalks, and other such trash into small pieces, and leave them strewn evenly on the ground.

In order to prevent the rear roller from being clogged by the trash thrown back upon it by the forward ones, as it would be, this roller has its shaft extended outward beyond the sides of the frame, and has a clutch and pinion, *i*, placed upon each end.

Adjustably fastened to each side of the frame, above the ends of the shaft, are the stub-axles *h*, having the curved slots *o* through them, and upon which axles are placed the driving-wheels *j*.

By making the axles slotted, as shown, the wheels can be adjusted so as to raise or lower the rear end of the machine, and thus cause the teeth of the rear roller, which is placed somewhat higher than the other, to run deeper or shallower in the earth, as may be preferred.

Secured to the inner side of each of the driving-wheels *j* is an internal gear, *l*, which meshes with the pinions, and, as the machine moves forward, causes the rear roller to constantly revolve. When the machine is being turned in either direction, one of the wheels *j* turns idly backward, while the other one continues to make the roller revolve.

The tongue *n* is fastened to the front end of the frame, and is supported upon the caster-wheel *r*, which wheel, in conjunction with the two *j*, enables the driver to regulate the depth to which all of the teeth shall cut.

Having thus described my invention, I claim—

The combination of the frame *a*, toothed rollers *g*, driving-wheels *j*, adjustable axles *h*, gears *i* and *l*, and caster-wheel *r*, substantially as set forth.

In testimony that I claim the foregoing I have hereunto set my hand and seal this 14th day of June, 1878.

DANIEL LOCKE. [L. S.]

Witnesses:
 ASA DIMON,
 F. C. BENJAMIN.